(12) United States Patent
Boerman (10) Patent No.: US 10,072,685 B2
(45) Date of Patent: Sep. 11, 2018

(54) CLIP HOLDING AND RELEASE DEVICE

(71) Applicant: Scott Boerman, Lapeer, MI (US)

(72) Inventor: Scott Boerman, Lapeer, MI (US)

( * ) Notice: Subject to any disclaimer, the term of this patent is extended or adjusted under 35 U.S.C. 154(b) by 0 days.

(21) Appl. No.: 15/430,768

(22) Filed: Feb. 13, 2017

(65) Prior Publication Data

US 2018/0031015 A1 Feb. 1, 2018

Related U.S. Application Data (60) Provisional application No. 62/294,910, filed on Feb. 12, 2016.

(51) Int. Cl.
*F16B 2/14* (2006.01)
*F16B 2/10* (2006.01)

(52) U.S. Cl.
CPC . *F16B 2/14* (2013.01); *F16B 2/10* (2013.01)

(58) Field of Classification Search
CPC . F16B 2/14; F16B 2/10; B25B 27/023; Y10T 4/44291; Y10T 4/44333; Y10T 4/44376; Y10T 4/44504; Y10T 4/44513
See application file for complete search history.

(56) References Cited

U.S. PATENT DOCUMENTS

| | | | | |
|---|---|---|---|---|
| 2,543,017 A * | 2/1951 | Hagan | ........................ | B66C 1/48 24/494 |
| 2,831,174 A * | 4/1958 | Hilmo | ..................... | H01R 11/24 439/482 |
| 3,810,294 A * | 5/1974 | Link | ..................... | B25B 27/023 29/261 |
| 3,984,798 A * | 10/1976 | Bussen | .................... | H01F 38/30 29/745 |
| 4,962,945 A * | 10/1990 | Vannoy | ..................... | B60D 1/00 213/139 |
| 5,380,338 A * | 1/1995 | Christian | ................ | A61B 90/50 600/102 |
| 7,966,703 B2 * | 6/2011 | Ubinana Felix | ....... | E04G 17/042 24/514 |
| 2001/0010779 A1 * | 8/2001 | Pfister | .................... | F16M 11/24 403/381 |
| 2010/0207385 A1 * | 8/2010 | Nishimura | ................ | F16B 2/10 285/364 |
| 2015/0167707 A1 * | 6/2015 | Hyers | ........................ | F16B 2/10 24/488 |
| 2016/0325928 A1 * | 11/2016 | Lepek | .................. | B65G 63/004 |

* cited by examiner

*Primary Examiner* — Robert Sandy
*Assistant Examiner* — Rowland Do (57) ABSTRACT

A clip holding and release device to hold and secure parts for inspection by holding and releasing a clip feature on a component or assembly. The clip holding and release device may include jaws that have a jaw top portion that may be opened and closed by displacing locking block. A shaft may be displaced directly with a knob, or using a lever, or other method which displaces a locking block to move the jaws in an open and closed position. The jaw top portion may have different configurations depending on the shape or configuration of the part to be inspected. The jaws may also be closed from the front side by displacing the jaws toward each other.

16 Claims, 5 Drawing Sheets

CLIP HOLDING AND RELEASE DEVICE

CROSS REFERENCE TO RELATED APPLICATIONS

This non-provisional patent application claims priority from provisional patent application No. 62/294,910 filed on 12 Feb. 2016 titled CLIP HOLDING AND RELEASE ASSEMBLY MACHINE DEVICE.

STATEMENT REGARDING FEDERALLY SPONSORED RESEARCH

Not Applicable

BACKGROUND OF INVENTION

Devices for holding clips in tooling and fixtures for checking fixtures and automation assembly fixtures in various industries are known in the art. Clip holding devices are used to alternately hold a clip of plastic, metal, or other material securely in a specific and repeatable location, with a release mechanism to allow disassembly of the clip and attached components without damage to the clip. This functionality is desirable to allow inspection or assembly of components or assemblies that include snap lock clip.

Conventional clip holding devices typically rely upon movable jaws that can be opened or closed from the backside of a clip holding assembly. Devices that operate in this manner require individual and unique motions for the closing and opening functions of the clip holding assembly. This results in reduced usability when closing the devices, as the operator of the fixture is typically working from the front side and therefore would be more accommodated if the devices could be closed with a front-side activation. Alternately some conventional technology consists of remote cable activation and deactivation which requires excessive cost, complexity, and fixture system design compromises.

To ensure a dimensionally stable and secure functionality, conventional devices are a size that is larger than is convenient for use in many fixture design applications. This size limitation often requires costly design compromises in adjacent components of fixtures which results in excessive cost and reduced quality of design of the entire fixture system.

Therefore, a need exists for a clip holding and releasing device, which can be closed by an activation from the front side, can be closed with a convenient simple motion from the back or side of the device, can be dimensionally stable and secure with a smaller size, and features which eliminate or reduce the other identified inefficiencies and costs of the conventional methods listed previously.

There is a need for a clip holding and release assembly which includes locking jaws and a locking block component within a holding body which employ design geometry, moving components, springs, and such which allow release by a human or mechanical operator from the backside or alternately from a side-access component or assembly. The arrangement also allows closing of the clip jaws from the front side. The entire system can be accomplished with size that can be accommodated in fixture assembly designs without undue compromises by adjacent components.

There is a need for a clip assembly that also provides the functions listed and required, including being dimensionally strong and stable enough for the necessary functions, in an overall size which can be incorporated into a fixture assembly design without undo encroachment on adjacent components of the fixture, which provides improved usability of invented clip holding device.

There is also a need for a method of holding and releasing a clip by providing a simulation of the mating surfaces of a component or assembly used in complex products, such as automobiles and other transport equipment. When in the closed position, the device provides a dimensionally correct and stable representation of the mating piece, often a portion of sheet metal or plastic molded part. When in the open position, the clip or assembly can be easily removed from the fixture without undue damage or flexing of the clip or assembly.

SUMMARY OF THE INVENTION

One aspect of the present invention, referred to as a clip holding and release device, comprising: a body; said body having a front side and a back side; said back side having a shaft hole therethrough; said body having a jaw pivotally secured within said body via a pivot pin; said jaw having a top portion that extends forwardly and outside of said body; said jaw extending rearwardly and terminating at a jaw inclined surface; a jaw spring disposed in said jaw above said pivot pin to bias said jaw in an open position; a shaft linearly displaceable through said shaft hole; a locking block secured to said shaft forwardly of said shaft hole; said locking block having a locking block top edge and a locking block lower edge disposed rearwardly from said locking block top edge; said locking block having an locking block inclined surface extending forwardly and inwardly from said locking block lower edge to said locking block top edge; said locking block inclined surface having substantially the same angle of incline as said jaw incline surface.

These described and other objects and advantages of the invention will be described in the following detailed description. In the description, the accompanied drawings are referenced which illustrate some preferred embodiments of the invention.

These and other features, aspects and advantages of the present invention will become better understood with reference to the following drawings, description and claims.

DETAILED DESCRIPTION OF THE INVENTION

Certain terminology will be used in the following description for convenience and reference only, and will not be limiting. For example, the words "upwardly," "downwardly," "rightwardly," "leftwardly," "forwardly" and "rearwardly" will refer to directions in the drawings to which reference is made. The words "inwardly" and "outwardly" will refer to directions toward and away from, respectively, the geometric center of the system and designated parts. Said terminology will include the words specifically mentioned, derivatives, and similar words. Also, "connected to," "secured to," or similar language includes the definitions "indirectly connected to," "directly connected to," "indirectly secured to," and "directly secured to."

Multiple embodiments of the system are disclosed herein. It will be understood that other objects and purposes of the invention, and variations thereof, will be apparent upon reading the following specification and inspecting the accompanying drawings.

Figure 1:
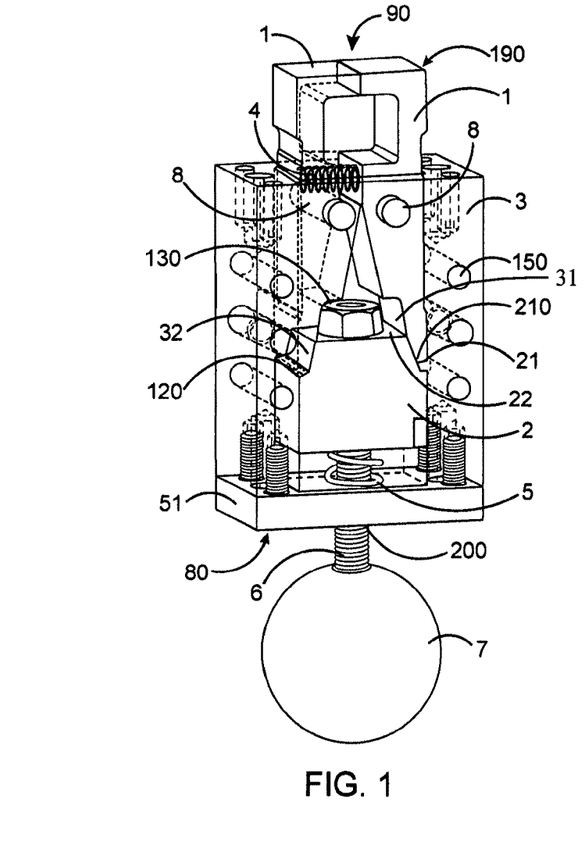
FIG. 1 is a perspective sectional view of a clip holding and release device in the closed position.

REFERENCE NUMERALS 1 jaws
2 locking block
3 body
4 jaw spring
5 shaft spring
6 shaft
7 knob
8 pivot pin
10 clip holding and release assembly or present invention or device
21 jaw lower surface
22 locking block top edge
23 jaw face
31 jaw inclined surface
32 locking block inclined surface
41 alternate jaw embodiments
51 bracket
52 lever
53 pivot pin
61 external part that clamp is secured to
62 hole
63 target part
70 pin
80 back side
90 front side
100 open position
110 closed position
120 locking block lower edge
130 bolt
140 face
150 bore
160 jaw inside angled surface
170 C-shaped cut-out
180 axis of body
190 jaw top portion
200 shaft hole
210 angle of incline
220 jaw spring recession
230 locking block slot Structure FIG. 1 illustrates one embodiment of the present invention 10, referred to as a clip holding and release device assembly 10. The present invention 10 may have a body 3. The body 3 may be comprised of one or more than one piece. The body 3 may be 2, 3, 4, 5, 6 or more plates. The body 3 may have a front side 90 and a back side 80. The back side 80 or bracket 51 may have a shaft hole 200 therethrough. The body 3 may have two opposed jaws 1 pivotally secured within said body 3 via a pivot pin 8. Two opposed jaws 1 are illustrated having a top portion 190 that extends forwardly and outside of the body 3. The jaws 1 extending rearwardly and terminating at a jaw inclined surface 31.

Figure 4:
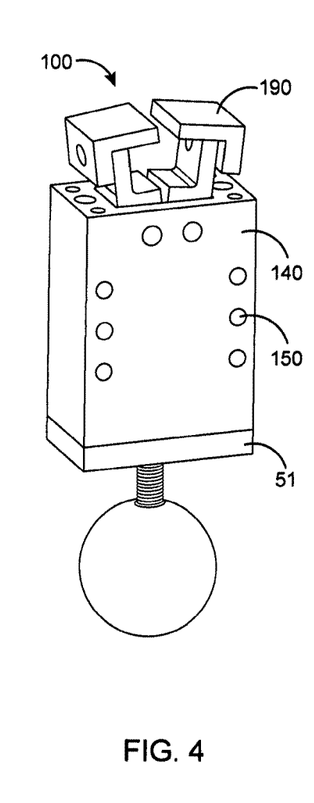
FIG. 4 is a pictorial view of the jaws in the open position.

A jaw spring 4 disposed in each of said jaw 1 above said pivot pin 8 to bias said jaw 1 in an open position 100, as seen in FIG. 4. A shaft 6 linearly displaceable through said shaft hole 200. A locking block 2 secured to said shaft 6 forwardly of said shaft hole 200. The locking block 2 having a locking block top edge 22 and a locking block lower edge 120 disposed rearwardly from the locking block top edge 22.

The locking block 2 may have a locking block inclined surface 32 extending forwardly and inwardly from the locking block lower edge 120 to said locking block top edge 22. The locking block inclined surface 32 having substantially the same angle of incline 210 as the jaw incline surface 31.

FIG. 1 also illustrates a bore 150 that extends through the body 3. The bores 150 can be used to secure the present invention 10 to something, so a clip 61 can be placed and secured in the jaws 1 for inspection. There may be one or more bores 150. The bores 150 may extend through the body 3 substantially perpendicular to the axis of body 180.

FIG. 1 further illustrates the jaw lower surface 21 immediately forwardly of the locking block lower edge 120, which is the relationship when the present invention 10 is in the closed position 110.

Figure 2:
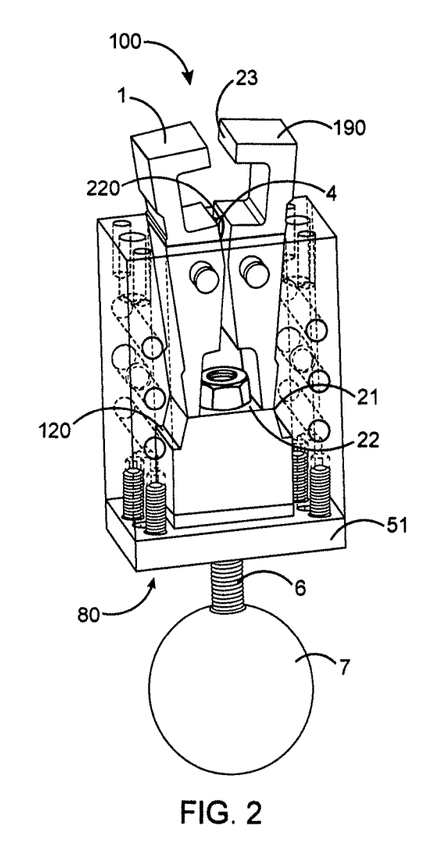
FIG. 2 is a perspective sectional view of one embodiment of the invention shown with the jaws in the open position.

FIG. 2 illustrates the present invention 10 in the open position 100. In the open position 100, the jaw lower surface 21 may rest forwardly on the locking block top edge 22. The clip holding and release device 10 is illustrated in the open position 100. The jaws 1 may have a jaw top portion 190 having a flat jaw face 23. The shaft 6 is illustrated with a knob 7 for actuation.

FIG. 2 also shows the jaws 1 having a jaw spring recession 220 that receives the jaw spring 4. The jaw spring recession 220 may be a round or cylindrical shaped cavity in the jaw 1 forwardly from the pivot pin 8 so the jaw spring 4 fits within the jaw spring recession 220 to bias the jaw top portions 190 away from each other.

Figure 3:
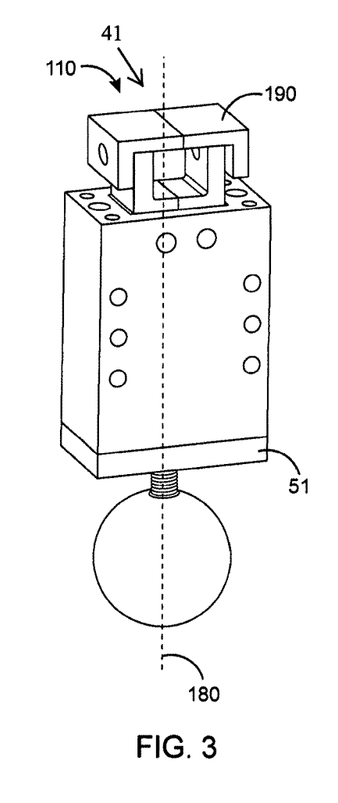
FIG. 3 illustrates a perspective view showing the jaws in the closed position.

FIG. 3 illustrates an embodiment of the present invention 10 with an axis of body 180 extending from the front side 90 to the back side 80. In one embodiment, the shaft 6 is displaced substantially parallel to the axis of body 180. The jaws 1 are illustrated in the closed position 110.

FIG. 4 illustrates an embodiment of the present invention 10 that may have two opposed faces 140, and a bore 150 extending through the body 3 and may extend from one face 140 to the other 140. The bores 150 may be used to secure the present invention 10 to something so the jaws 1 can be closed to inspect an external part 61.

Figure 5:
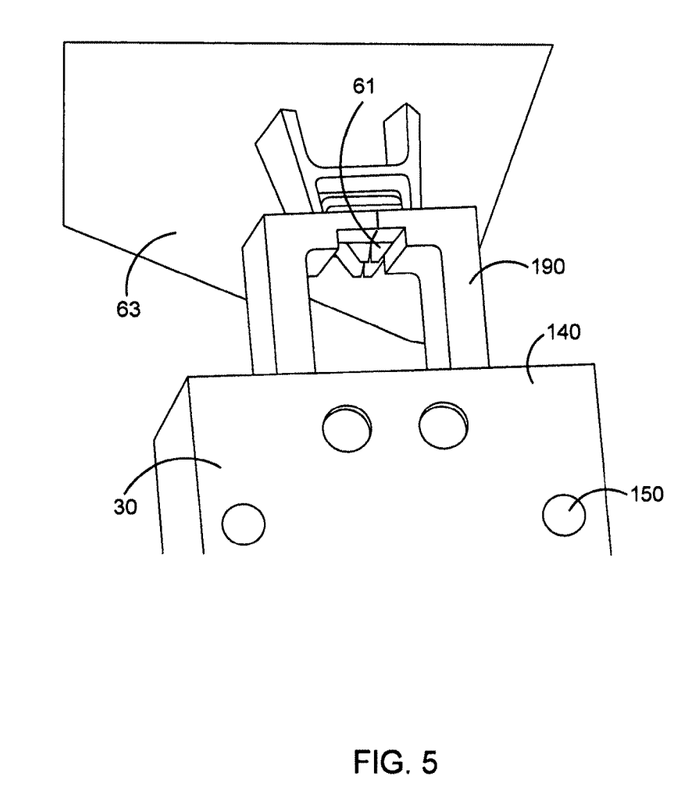
FIG. 5 is a pictorial view of a typical application of the invented device applied to hold and release a clip in a target part.

FIG. 5 illustrates the present invention 10 holding an external part 61 between the jaws 1 or between the jaw faces 23. A face 140 is shown with a bore 150 through the body 3.

Figure 6:
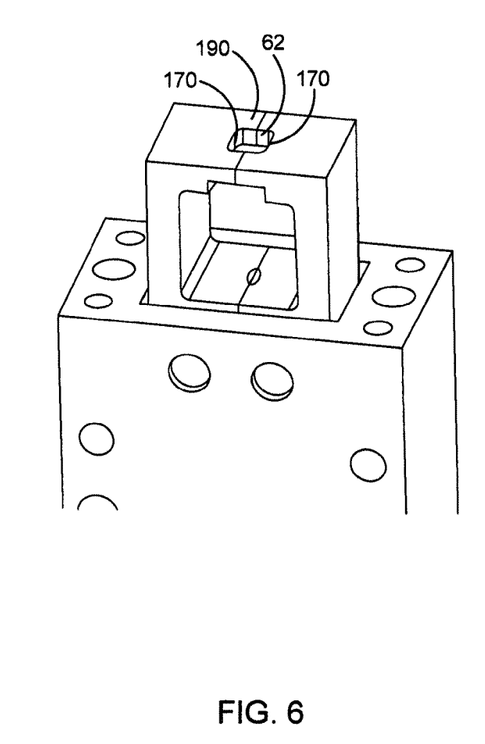
FIG. 6 is a pictorial view of an embodiment of a device in a typical configuration with a hole formed by the jaws installed which is intended to simulated a hole in the target part's mating component.

FIG. 6 illustrates the jaws 1, each jaw 1 having a C-shaped cut out 170. Thus, when the jaws are in the closed position 110 a substantially square hole 62 is formed to hold an external part 61.

Figure 7:
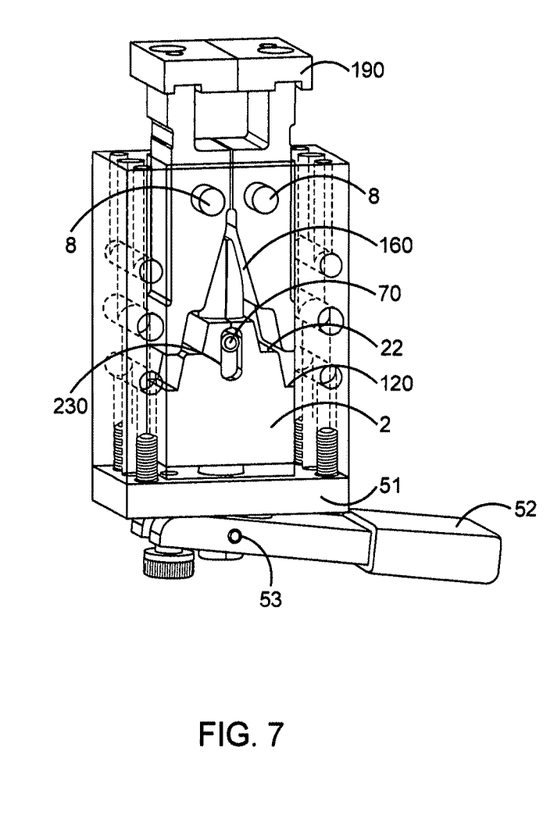
FIG. 7 illustrates another embodiment of the present invention having a lever to actuate the present invention and the locking body is secured to a shaft by a pin.

FIG. 7 illustrates the present invention 10 having a lever 52 used to displace the shaft 6. Shaft 6 may be displaced substantially parallel to the axis of body 180, as illustrated in FIG. 3. The lever 52 may be pivotally secured to a pivot pin 53 secured to a bracket 51, or secured to arms extending downwardly from the bracket 51.

FIG. 7 illustrates the locking block 2 that may be secured to the shaft 6 via a pin 70. The locking block 2 has a locking block lower edge 120, and a locking block top edge 22 disposed forwardly from said locking block lower edge 120. The jaw top portion 190 is illustrated. The jaw top portion 190 may have different configurations. For example, in FIG. 6, the jaw top portions 190 each have a C-shaped cut out 170. FIG. 7 also illustrates the locking block 2 having a locking block slot 230 extending longitudinally. Pin 70 is further illustrated extending through the locking block slot 230 and through the shaft 6 to secure the shaft 6 to the locking block 2.

Figure 8:
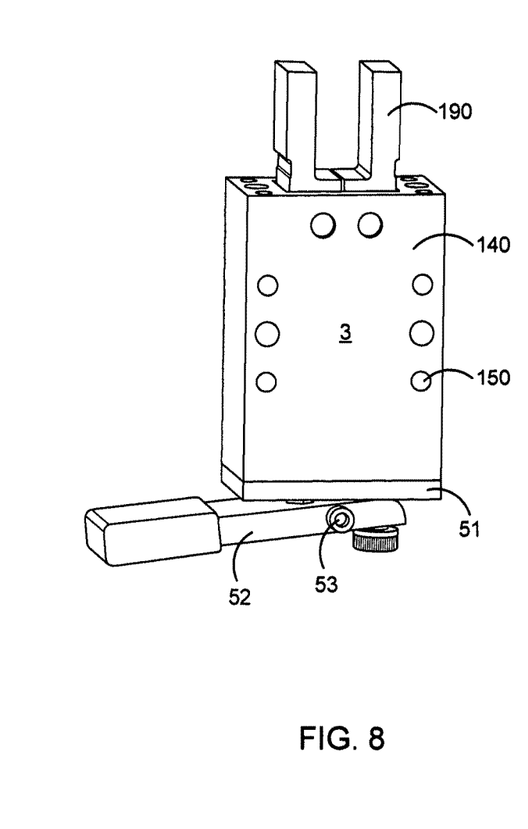
FIG. 8 illustrates a variation of the jaws or jaw top portion.

FIG. 8 illustrates another embodiment of the present invention 10 having the jaw top portion 190 being two upstanding fingers.

Operation and Usage

The present invention 10 provides a clip assembly 10 or clip holding device 10 or fixture 10, for parts or assemblies which are to be held in the clip holding and release device 10. Typically, parts or assemblies are secured to device 10 for dimensional or visual inspection, or for purposes of additional assembly or other secondary processes.

The device 10 may employs jaws 1, a locking block component 2, a body 3, and springs 4 and 5 or other mechanical force application features which act together to provide for maintained hold open position 100 and hold closed position 110. The jaws 1 may be placed in the closed position by displacing the locking block 2, or by manually squeezing the jaws 1 together, or displacing each jaw top portion 190 toward the opposed jaw 1 or jaw top portion 190. As the jaw top portions 190 are displaced toward each other 190, the jaw lower surfaces 21 are pivoted away from the opposed jaw lower surface 21, moving the jaw lower surface 21 off and outside of said locking block 2. Therefore, the locking block 2 is displaced forwardly via the shaft spring 5.

The jaws 1 can move from the open position 100 to the closed position 110 by either manually or mechanized from the front side 90, allow a straight-line opening actuation from the backside 80. A lever 52 may be connected to a shaft 6, and may provide a lever 52 to provide either manual or mechanical actuation from a side position as seen in FIG. 7. Bores 150 or mounting features 150 may be disposed through the present invention 10, which can be used to mount or secure the present invention 10 to something.

FIG. 1 illustrates one embodiment of the invention, with jaws 1 which may have a hole 62 (FIG. 6) which typically simulate a mating part with which the target part's clip feature interfaces 61. The jaws 1 fit into the body 3 with precision to allow the jaws 1 to rotate about pivot pin 8 to open and closed positions. Jaw spring 4 is fitted to apply force in an opening direction to the jaws 1.

Other embodiments may employ 1, 2 or more springs which may be compressive, extensive, or torsional in other locations within the assembly to have the same effect of applying opening force.

Also fitting within the body 3 is a locking block 2 which can move linearly and longitudinally within the body 3. The locking block 2 may move in a direction parallel or substantially parallel to the axis of body 180. Shaft spring 5 provides force to influence locking block 2 to be motivated toward the front side 90 of the device. Shaft 6 and knob 7 show one embodiment of components which allow a human or mechanical operator to apply force in a direction opposite the shaft spring 5 to execute the opening function.

During opening activation, locking block 2 travels rearwardly allowing jaw spring 4 to produce rotational motion of jaws 1 toward the open position 100. Near the end of the opening motion, the jaw lower surface 21 of jaws 1 make contact with locking block lower edge 120 of locking block 2 to support sliding block 2 and prevent locking block 2 from moving forwardly after opening motion is complete.

Upon closing activation, activated by application of inward acting force upon jaws 1 by manual or mechanical means, the jaws 1 rotate toward each other until surfaces 23 of jaws 1 contact each other. At the closed position 110 locking block 2 is prevented from moving forwardly because the jaw inclined surface 31 contacts the locking block inclined surface 32, preventing the locking block 2, from moving forwardly.

At the point during the closing actuation when moving from the closed position 110 to the open position 100, the locking block 2 may move or displace rearwardly toward the back side 80. A locking block inclined surface 32 may extend upwardly and inwardly from the locking block edge lower 120 to the locking block top edge 22.

The locking block 2 may be securely connected to the shaft 6. The locking block 2 may be connected to the shaft 6 by a bolt 130 as illustrated in FIG. 1. In another embodiment, the locking block 2 may be secured to the shaft 6 via a pin 70 as illustrated in FIG. 7.

To close the jaws 1 and place the jaws 1 in the closed position 110 the locking block 2 is displaced forwardly by moving the shaft 6 forwardly. This can be performed by moving the knob 7 forwardly as seen in FIG. 1. In another embodiment, a lever 52 can be moved to displace the shaft 6 forwardly, as seen in FIG. 7. As the shaft 6 and locking block 2 are displaced forwardly from the open position 100 the shaft 6 spreads the jaws 1 apart beneath the pivot pin 8 by contacting a jaw inside angled surface 160. The shaft spring 5 biases the locking block 2 forwardly to keep the present invention 10 in the closed position 110 until the shaft 6 is displaced rearwardly to place the clip assembly 10 in the open position 100.

Alternatively, there may be an embodiment where the shaft 6 is secured to the locking block 2 via a bolt 130, and the shaft 6 may not extend forwardly of the bolt 130, as seen in FIG. 1. In this embodiment as the locking block 2 moves forward toward the front of the clip assembly 10, surfaces 32 of locking block 2 make contact and apply outward force on the jaw inclined surfaces 31 of jaws 1. This force brings the surfaces 23 of the jaws 1 together and maintains this force until the opening activation motion is initiated.

FIGS. 3 and 4 show the open and closed position 100, 110 of one non-limited embodiment of the device 10. The jaws 1 may have a variety of shapes, depending on what the jaw 1 holds. For example, the jaws 1 of FIGS. 3 and 4 have a jaw top portion 190 having a flat jaw face 23. However, each jaw top portion 190 of FIG. 6 has C-shaped cut-out 170 to form a square or rectangular hole 62.

Acting together, these features provide for a lever actuation of the device which provides for more convenient use and for incorporation into a design where limited access to the backside 80 of the device 10 is available, or for other purposes.

FIG. 5 displays a typical application of the device 10. Wherein previous figures show the front end of jaws 1 or an alternate jaw component 41 with continuous mating surfaces 23. FIG. 6 shows an opening 62 which is typically included within the device to provide an interface for clip 61 to attach to. The clip 61 is part of a member to be inspected. The clip 61 is secured in place by the jaws 1. The jaw face 23 and jaw face top portion 190 can have a variety of configurations to hold the clip 61.

FIG. 5 shows the present invention 10 or clip assembly 10 in a typical application wherein clip feature 61 of target part 63 is engaged in the hole 62 or opening 62 of the present invention 10 in the closed position 110. The jaws 1 providing a secure and precise holding of the clip 61 in a specific position, and jaw thickness of a specified thickness to allow measurement or other evaluation, or other secondary operations to be accomplished on target part 63. Upon opening, clip feature 61 is free to be removed from the present invention 10, with no undue damage nor effect on the clip feature 61 or target part 63.

FIG. 7 depicts another embodiment of the present invention 10. This embodiment includes a lever 52 device to allow actuation of the shaft 6 from a location other than the axis of the body 180 of the present invention 10 with either manual or mechanical means. A bracket 51 may be attached to body 3 as seen in FIGS. 1-4 and 8. The bracket 51 may be disposed or secured to the bottom of the body 3. A pivot pin 53 pivotally attaches lever 52 to the bracket 51 and allow rotation motion of lever 52. Upon application of force, lever 52 applies rearward and forward acting force to shaft 6, which may be rigid or flexible construction, which is attached either rigidly or non-rigidly to locking block 2.

The description herein shows the currently envisioned preferred embodiments of the invented device, various alteration of the device configuration can be made which do not depart from the scope of the invention and the associated Claims.

Although particular preferred embodiments of the invention have been discussed in detail for illustrative purposes, it will be recognized that variations or modifications of the disclosed apparatus, including the rearrangement of parts, lie within the scope of the present invention.

I claim:

1. A clip holding and release device, comprising:
   a body;
   said body having a front side and a back side;
   said back side having a shaft hole therethrough;
   said body having a jaw pivotally secured within said body via a pivot pin;
   said jaw having a top portion that extends forwardly and outside of said body;
   said jaw extending rearwardly;
   a jaw spring disposed in said jaw above said pivot pin to bias said jaw in an open position;
   a shaft linearly displaceable through said shaft hole;
   a locking block secured to said shaft forwardly of said shaft hole;
   said locking block having a locking block top edge and a locking block lower edge disposed rearwardly from said locking block top edge;
   said locking block having a locking block inclined surface extending forwardly and inwardly from said locking block lower edge to said locking block top edge; and
   said locking block inclined surface having substantially a same angle of incline a jaw inclined surface.

2. The clip holding and release device of claim 1, further comprising: a jaw spring recession in said jaw disposed above said pivot pin; whereby said jaw spring rests in said jaw spring recession.

3. The clip holding and release device of claim 1, further comprising: a bolt fastened to the shaft to secure said locking block to said shaft.

4. The clip holding and release device of claim 1, further comprising: a locking block slot disposed in said locking block extending longitudinally to substantially parallel to an axis of said body.

5. The clip holding and release device of claim 1, whereby a displacement of said shaft displaces said locking block with respect to said jaw.

6. The clip holding and release device of claim 5, whereby when the clip holding and release device is in a closed position a displacement of said locking block rearwardly positions the clip holding and release device in said open position.

7. The clip holding and release device of claim 5, whereby when the clip holding and release device is in said open position a displacement of said locking block forwardly positions the clip holding and release device in a closed position.

8. The clip holding and release device of claim 1, further comprising a bore extending through the body in a direction substantially perpendicular to an axis direction of said body.

9. The clip holding and release device of claim 1, further comprising a lever pivotally connected to said shaft rearwardly of said back side by another pivot pin that extends through said lever and shaft.

10. The clip holding and release device of claim 1, further comprising a knob secured to the shaft rearwardly of the shaft hole.

11. The clip holding and release device of claim 1 having two opposed jaws and two opposed jaw top portions.

12. The clip holding and release device of claim 1 wherein said jaw extending rearwardly and terminating at a jaw inclined surface.

13. A clip holding and release device, comprising:
   a body;
   said body having a front side and a back side;
   said back side having a shaft hole therethrough;
   said body having a jaw pivotally secured within said body via a pivot pin;
   said jaw having a top portion that extends forwardly and outside of said body;
   said jaw extending rearwardly;
   a jaw spring disposed in said jaw above said pivot pin to bias said jaw in an open position;
   a shaft linearly displaceable through said shaft hole;
   a locking block secured to said shaft forwardly of said shaft hole;
   said locking block having a locking block top edge and a locking block lower edge disposed rearwardly from said locking block top edge;
   whereby a displacement of said shaft displaces said locking block with respect to said jaw.

14. The clip holding and release device of claim 13, whereby when the clip holding and release device is in a closed position a displacement of said locking block rearwardly positions the clip holding and release device in said open position.

15. The clip holding and release device of claim 13, whereby when the clip holding and release device is in said open position a displacement of said locking block forwardly positions the clip holding and release device in a closed position.

16. A clip holding and release device, comprising:
   a body;
   said body having a front side and a back side;
   said back side having a shaft hole therethrough;
   said body having a jaw pivotally secured within said body via a pivot pin;
   said jaw having a top portion that extends forwardly and outside of said body;
   said jaw extending rearwardly;

a jaw spring disposed in said jaw above said pivot pin to
bias said jaw in an open position;
a shaft linearly displaceable through said shaft hole;
a locking block secured to said shaft forwardly of said
shaft hole;
said locking block having a locking block top edge and a
locking block lower edge disposed rearwardly from
said locking block top edge; and
a knob secured to the shaft rearwardly of the shaft hole;
wherein the shaft is between the knob and said jaw.

\* \* \* \* \*